US009043181B2

(12) United States Patent
Masuda

(10) Patent No.: US 9,043,181 B2
(45) Date of Patent: May 26, 2015

(54) METHOD FOR DETERMINING COORDINATES

(75) Inventor: Motohiko Masuda, Fujieda (JP)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 536 days.

(21) Appl. No.: 13/488,446

(22) Filed: Jun. 5, 2012

(65) Prior Publication Data

US 2013/0325393 A1 Dec. 5, 2013

(51) Int. Cl.
*G06T 5/00* (2006.01)

(52) U.S. Cl.
CPC ....... *G06T 5/006* (2013.01); *H01J 2237/30438* (2013.01); *G06T 2207/30148* (2013.01)

(58) Field of Classification Search
CPC ........................................................ G06T 5/006
USPC .......................................................... 702/150
See application file for complete search history.

(56) References Cited

U.S. PATENT DOCUMENTS

| | | | | |
|---|---|---|---|---|
| 7,421,150 | B2 | 9/2008 | Kim | |
| 2008/0265158 | A1 | 10/2008 | Iwasaki | |
| 2010/0245564 | A1* | 9/2010 | Nam et al. | 348/135 |
| 2012/0136623 | A1* | 5/2012 | Edge et al. | 702/150 |
| 2013/0271324 | A1* | 10/2013 | Sendonaris et al. | 342/450 |

OTHER PUBLICATIONS

Valery Ray and Chris Gerlinsky, "CAD-less Blind Navigation in Focused Ion Beam System," Proceedings of hte 31st International Symposium for Testing and Failure Analysis, San Jose, CA, Nov. 6-10, 2005.

* cited by examiner

*Primary Examiner* — Bryan Bui
(74) *Attorney, Agent, or Firm* — Charles Bergere

(57) ABSTRACT

A method for determining the coordinates of a point on the surface of an object is provided. A source system, such as an OBIRCH system, is used to analyze and detect faults in an integrated circuit on a semiconductor die. The die includes three reference points and the detected fault(s) are defined with reference to the reference points. When the die is transferred to a FIB or other system for fault analysis, a processor determines the coordinates of the fault(s) for the FIB system using the three reference points.

18 Claims, 5 Drawing Sheets

400

405 PROVIDING DESTINATION SYSTEM WITH SOURCE SYSTEM COORDINATES
410 SELECTING PAIRS OF SOURCE SYSTEM REFERENCE COORDINATES
415 IDENTIFYING DESTINATION SYSTEM REFERENCE COORDINATES
420 ESTIMATING AXIAL ROTATION ANGLES
425 ESTIMATING SYSTEM AXIAL VALUE CONVERSION COEFFICIENTS
430 ESTIMATING AXIAL ORIGIN OFFSET VALUES
435 CALCULATING ESTIMATED COORDINATES
440 COMPARING COORDINATES
445 ESTIMATING COORDINATES FOR SELECTED POINT

METHOD FOR DETERMINING COORDINATES

BACKGROUND OF THE INVENTION

The present invention relates to a method for estimating coordinates for a destination system, and, more particularly, to a method for estimating coordinates for faults detected on a semiconductor wafer and provided to a destination system for locating the detected faults on the wafer.

When a source system detects faults on semiconductor die surface, these faults often require analysis by a destination system (analytical system) in order to determine the type and cause of the fault(s). For example, Optical Beam Induced Resistance Change (OBIRCH) may be used to analyze integrated circuits on a wafer for faults and then a Focused Ion Beam (FIB) system may be used for site specific fault analysis. When the wafer is moved from the OBIRCH system to the FIB system, the location of the faults must be precisely and accurately defined. However, the transfer of the coordinates of the detected faults may result in inaccurate or problematic detection of the faults by the destination system due to misalignment and scaling errors between the two systems.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
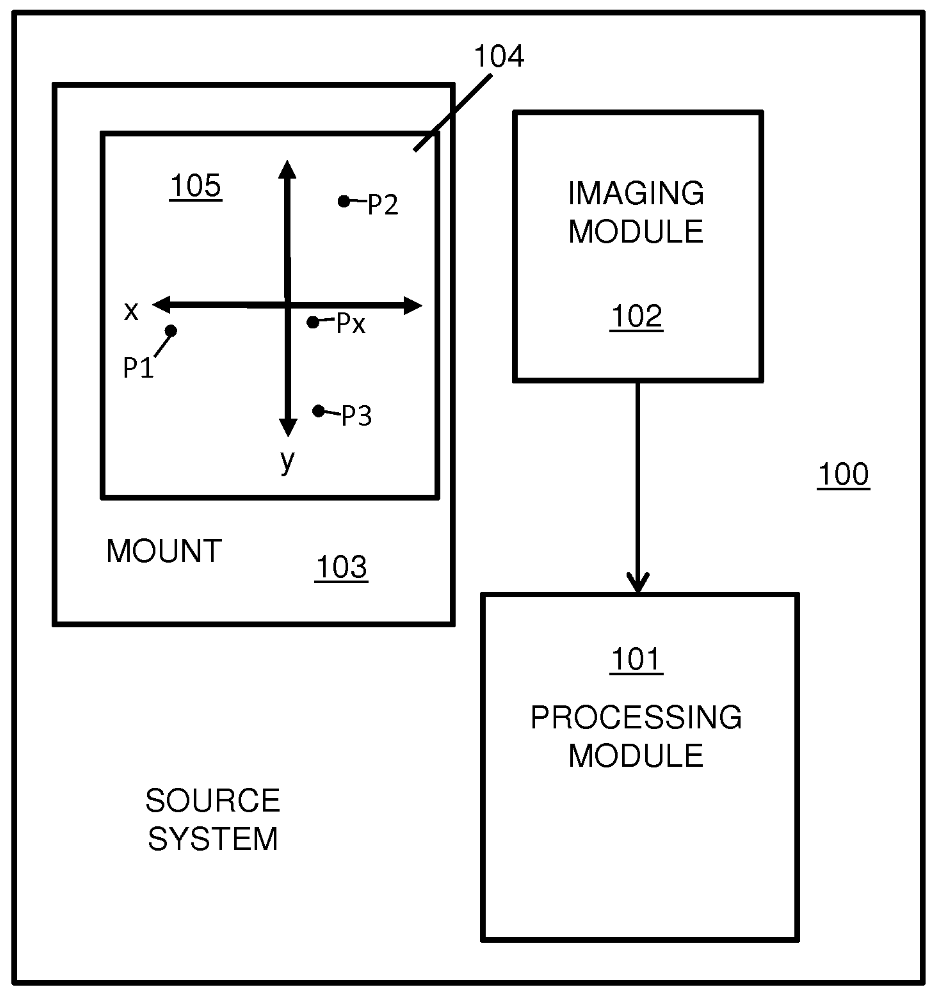
FIG. 1 is a schematic diagram of a prior art source system.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, method steps and structures that comprises a list of elements does not include only those elements but may include other elements not expressly listed or inherent to such module, circuit, steps or device components. An element or step proceeded by "comprises" does not, without more constraints, preclude the existence of additional identical elements or steps that comprises the element or step. It is also to be understood that the terms parameter and variable have the same meaning and are interchangeable throughout this specification In one embodiment, the present invention provides a method for estimating coordinates for a destination system, the coordinates identifying a location of at least one selected point on a surface of an object from data provided from a source system. The data comprises a source system reference coordinates for three reference points marked on the surface and source system coordinates for the selected point. The method provides the destination system with the source system reference coordinates and the source system coordinates for the selected point and then a process of selecting pairs of the source system reference coordinates is performed.

The method identifies destination system reference coordinates, from the three reference points, and then estimates at least three axial rotation angles of the reference points identified by the destination system reference coordinates relative to the reference points identified by the source system reference coordinates. The axial rotation angles are determined by comparing the pairs of the source reference coordinates with corresponding pairs of the destination reference coordinates. The method estimates system axial origin offset values based on the source system reference coordinates and the destination system reference coordinates and calculates estimated coordinates of each destination system reference point based on at least one of the axial rotation angles, the system axial origin offset values and source reference coordinates. The estimated coordinates of the destination system reference points are compared with the destination system reference coordinates to determine which estimated axial rotation angle provides a least error value. The method then estimates the destination system coordinates of the location of the selected point from the system axial origin offset values, source coordinates for the selected point and the estimated axial rotation angle that provides the least error value.

In another embodiment, the present invention provides a multi-parameter bisecting regression method for determining values of a function's variables that result in a minimum or maximum value of the function. The method selects a variable value from one of the variables and a variable range, wherein the variable is centre value at the centre of the range. The method determines mid-centre values of the range and calculates five function values for the function based on variable values of the range extremities, mid-centre values and the centre value. There is then performed an updating the centre value with a new centre value. The new centre value is selected from the variable value that indicates a minimum or maximum function value and the method then performs reducing the variable range and determining new mid-centre values. The method then repeats the calculating five function values, updating the centre value, reducing the variable range and determining new mid-centre values until a threshold value is reached.

Referring to FIG. 1, a schematic diagram of a prior art source system 100 is shown. The source system 100 includes a processing module 101 coupled to an imaging module 102 and a mount 103 for mounting an object 104 such as a silicon die to the system 100. The object 104 has a surface 105 with three reference points P1, P2, P3 that have distinctive markings so that each reference point can be individually identified and distinguished from the other reference points. In operation, the source system 100 identifies at least one selected point Px (or points) which in one form is a fault on a silicon die that has been identified by the source system 100. The coordinates of the three reference points P1, P2, P3 and the selected point Px are determined with reference to the X-Y axes.

Figure 2:
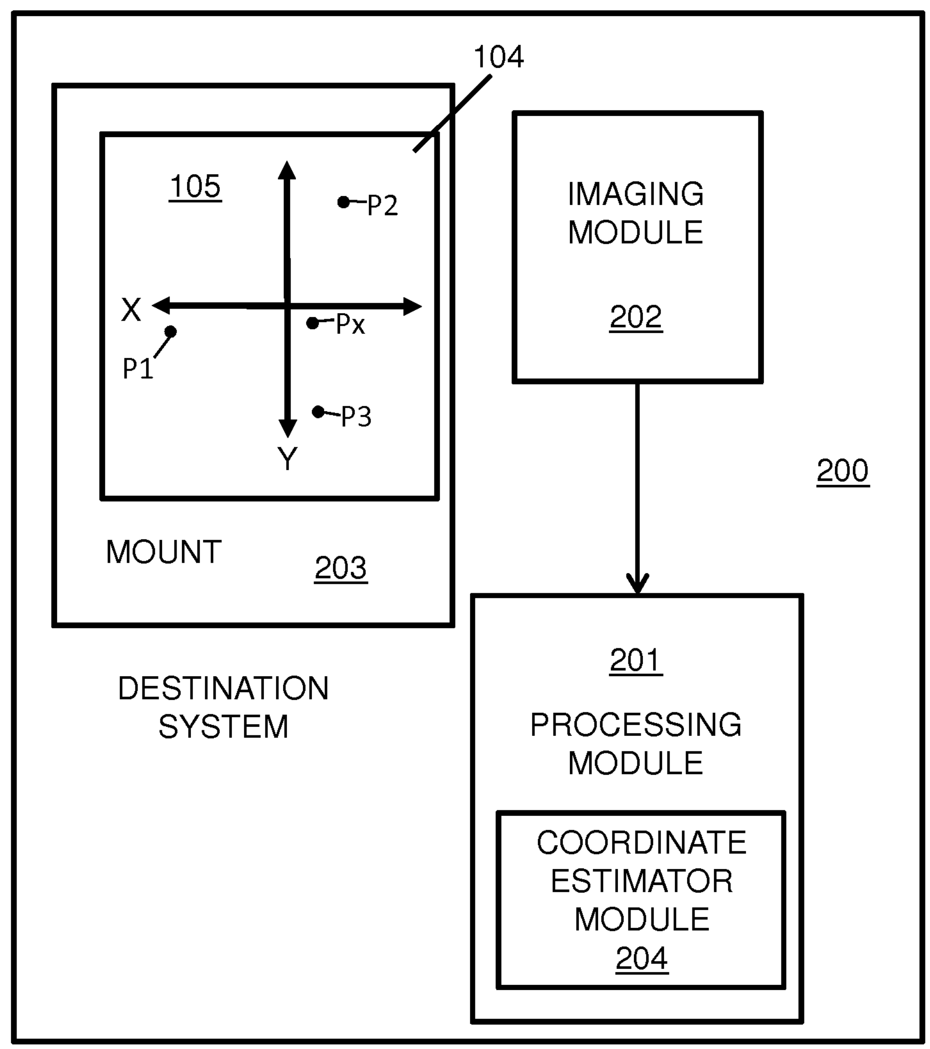
FIG. 2 is a schematic diagram of a destination system in accordance with a preferred embodiment of the present invention.

Referring to FIG. 2, a schematic diagram of a destination system 200 in accordance with a preferred embodiment of the present invention is shown. The destination system 200 includes a processing module 201 coupled to an imaging module 202. The processing module 201 has a coordinate estimator module 204. The destination system 200 also has a mount 203 for mounting the object 104 to the destination system 200. The coordinates of the three reference points P1, P2, P3 and the selected point Px are determined with reference to the X-Y axes.

Figure 3:
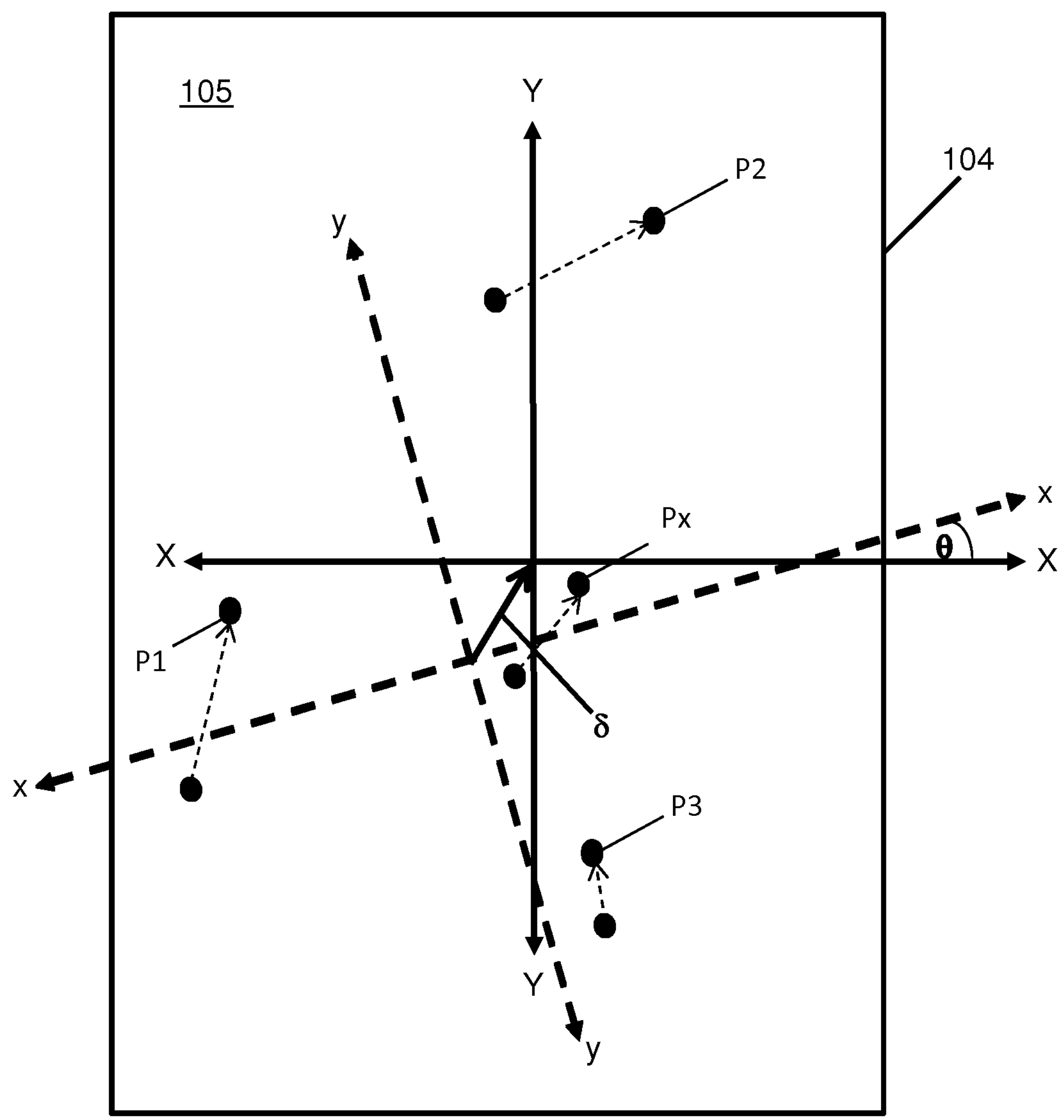
FIG. 3 illustrates an example of the object with three reference points and a selected point as observed by an imaging module of the destination system of FIG. 2.

FIG. 3 shows an example of the object 104 with the three reference points P1, P2, P3 and a selected point Px on the surface 105 as observed by the imaging module 202. The coordinates (destination system coordinates X, Y) of the three reference points P1, P2, P3 are identified by the imaging module 202 based on the destination system reference axes X, Y. Also illustrated is an example of the reference axes X, Y of the source system 100 that have been rotated by an axial rotation angle θ relative to the reference axes X, Y of the destination system 200. Further, the origin of the source system's reference axes X, Y has been offset from the destination system axes X, Y by origin offset values δx, δy.

The origin offset values δx, δy and relative axial rotation angle θ are caused by difficulties in accurately and consistently aligning the object 104 when positioned on the source system mount 103 and thereafter positioning the same object 104 in the mount 203 of the destination system. As a result, coordinates (x, y) for the selected point Px and the reference points P1, P2, P3 provided by the source system 100 do not accurately reflect the same positions on the surface 105 as detected by the destination system 200. The destination system 200 should therefore at least take into account the origin offset values δx, δy and relative axial rotation angle θ in order to estimate the coordinates of the selected point Px using its coordinate axes X, Y.

Figure 4:
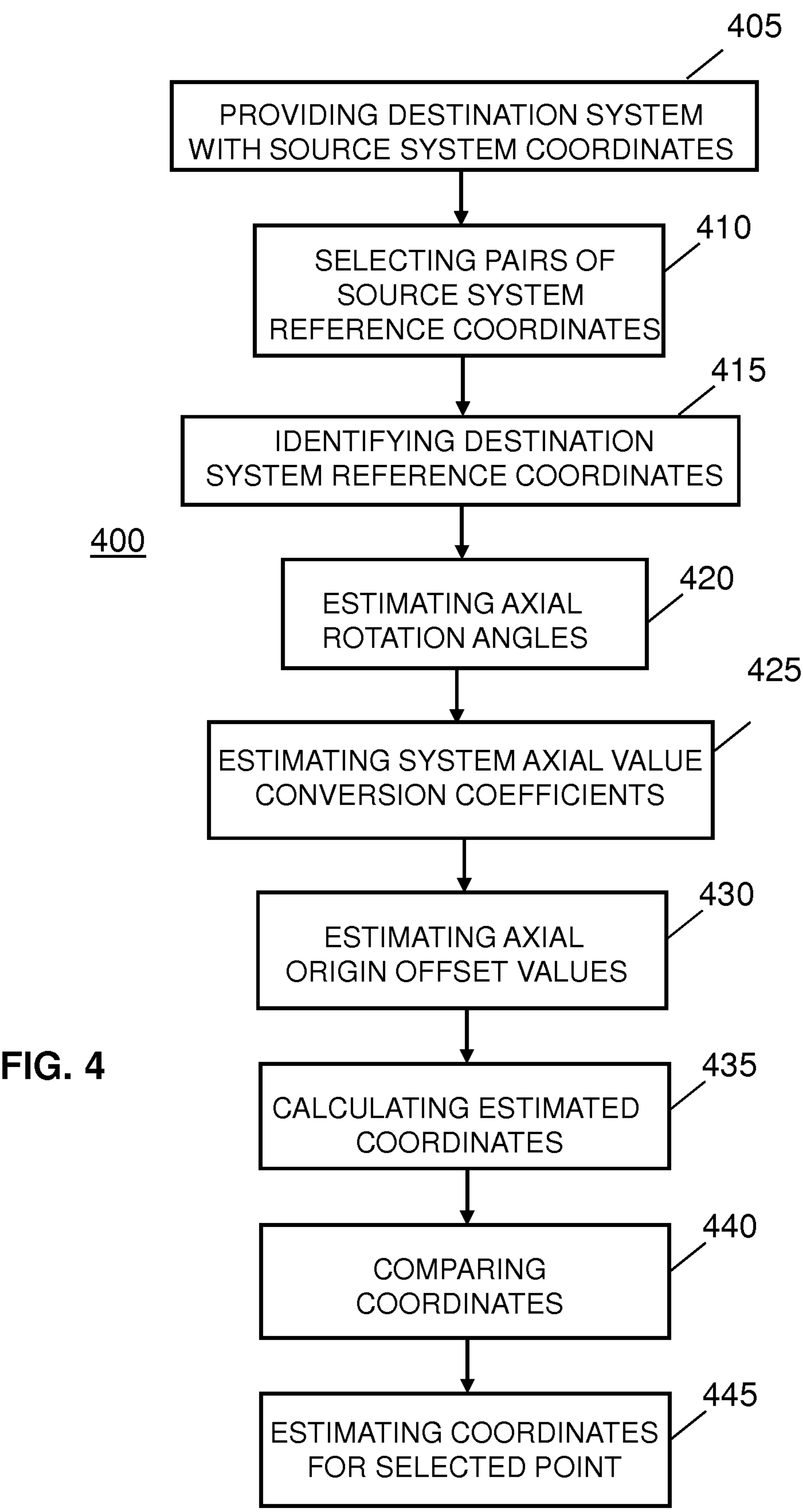
FIG. 4 is a flow chart illustrating a method for estimating coordinates for the destination system in accordance with a preferred embodiment of the present invention.

FIG. 4 is a flow chart of a method 400 for estimating coordinates (X, Y) for the destination system 200 in accordance with a preferred embodiment of the present invention. The method 400, primarily performed by the coordinate estimator module 204, estimates the coordinates (X, Y) in order to identify a location of the selected point Px on a surface 105 of the object 104 from data provided from the source system 100. The data comprises the source system reference coordinates (x, y) for the three reference points P1, P2, P3 marked on the surface 105 and source system coordinates (x, y) for the selected point Px.

The method 400, at a providing block 405, performs providing the destination system 200 with the source system reference coordinates (x, y) for reference points P1, P2, P3 and the source system coordinates for the selected point Px. These coordinates (x, y) may be provided in numerous ways including a wireless or cable link between both systems 100 and 200, by manual input, by bar code scanning or by use of portable memory storage mediums.

At a selecting block 410, the method 400 performs selecting pairs of the source system reference coordinates (x, y). Since there are three reference points P1, P2 and P3 there are three pairs, these three pairs are: P1 and P2; P2 and P3; and P1 and P3. The method 400, at an identifying block 415, then performs identifying the destination system reference coordinates (X, Y) from the three reference points P1, P2 and P3 by use of the imaging module 202.

At an estimating axial rotation block 420 the method 400 performs estimating three axial rotation angles θ of the reference points P1, P2 and P3 identified by the destination system reference coordinates (X, Y) relative to the reference points P1, P2 and P3 identified by the source system reference coordinates (x, y). The axial rotation angles θ are determined by comparing the pairs of the source system reference coordinates (x, y) with corresponding pairs of the destination reference coordinates (X, Y). More specifically, the estimating axial rotation is performed as follows:

For any pair of source reference coordinates and corresponding pair of destination reference coordinates let the coordinates for the source reference points be x1, y1 and x2, y2 and the corresponding destination reference coordinates be X1, Y1 and X2, Y2, then $\theta=\tan^{-1}\{(y2-y1)/(x2-x1)\}-\tan^{-1}\{(Y2-Y1)/(X2-X1)\}$.

By way of example, if the coordinates for the source system reference points are P1=−8, 6, P2=9, 10 and P3=2, −6; and the coordinates for the destination system reference points are P1=−58, −5, P2=20, 49 and P3=14, −48 then for the pair P1 and P2 the estimated axial rotation angle $\theta_{p1,p2}$ is:

$$\theta_{p1,p2}=\tan^{-1}\{(10-6)/(9-(-8)\}-\tan^{-1}\{(49-(-5))/(20-(-58))\}$$

$$\theta_{p1,p2}=-0.37445 \text{ radians.}$$

Similarly, for the pair P2 and P3 the estimated axial rotation angle $\theta_{p2,p3}$ is:

$$\theta_{p2,p3}=\tan^{-1}\{(-6-10)/(2-9)\}-\tan^{-1}\{(-48-49))/(14-20)\}$$

$$\theta_{p2,p3}=-0.35063 \text{ radians.}$$

Also, for the pair P1 and P3 the estimated axial rotation angle $\theta_{p1,p3}$ is:

$$\theta_{p1,p3}=\tan^{-1}\{(-6-6)/(2-(-8))\}-\tan^{-1}\{(-48-(-5))/(14-(-58))\}$$

$$\theta_{p1,p3}=-0.33768 \text{ radians.}$$

The source system 100 and destination system 200 may have different distances representing discreet axial coordinates, for instance a value of x=5 on the source system x axis may equate to 5 mm whereas a value of X on the destination system X axis may equate to 10 mm. Therefore an axial value conversion coefficient Udr may be required when estimating the axial origin offset values δx, δy. It should be noted that the conversion coefficient Udr may be a known constant, it may be negligible (i.e. there may be an approximate 1 to 1 conversion between the source and destination system) or the conversion coefficient Udr may need to be estimated. The method 400 therefore, at an optional estimating block 425, estimates the axial value conversion coefficient Udr as follows:

$$Udr_{p1,p2}=\text{SQRT}\{[(y2-y1)^2+(x2-x1)^2]/[(Y2-Y1)^2+(X2-X1)^2]\}.$$

$$Udr_{p2,p3}=\text{SQRT}\{[(y3-y2)^2+(x3-x2)^2]/[(Y3-Y2)^2+(X3-X2)^2]\}.$$

$$Udr_{p1,p3}=\text{SQRT}\{[(y3-y1)^2+(x3-x1)^2]/[(Y3-Y1)^2+(X3-X1)^2]\}.$$

Using the above example coordinates P1=−8, 6, P2=9, 10 and P3=2, −6 (reference point coordinates identified by the source system); and the coordinates for the destination system reference points P1=−58, −5, P2=20, 49 and P3=14, −48 then the resulting axial value conversion coefficients Udr are: $Udr_{p1,p2}=0.184089$; $Udr_{p2,p3}=0.1797$; and $Udr_{p1,p3}=0.186262$.

Once the conversion coefficient(s) Udr have been estimated or otherwise determined (or deemed negligible), the method 400, at a block 430, then performs estimating system axial origin offset values δx, δy which in general terms is based on the source system reference coordinates (x, y) for reference points P1, P2, P3 and the destination system reference coordinates (X, Y) for the reference points P1, P2, P3. More specifically, the system axial origin offset values δx, δy are estimated based on estimated axial origin offset values of the destination system axes (X, Y) compared with the source system axes (x, y) for each of the axial rotation angles $\theta_{p1,p2}$, $\theta_{p2,p3}$ and $\theta_{p1,p3}$. The general formula for estimating an axial origin offset value along the X axis is: δxp=X−(x cos θ+y sin θ), or alternatively when the conversion coefficient Udr is required the axial origin offset value δxp=X−(x cos θ+y sin θ)*Udr. Similarly, the general formula for estimating an axial origin offset value along the Y axis is: δyp=Y−(−x sin θ+y cos θ), or alternatively when the conversion coefficient Udr is required the axial origin offset value δyp=Y−(−x sin θ+y cos θ)*Udr.

More specifically, the following calculations are performed to estimate the individual axial origin offset values δxp, δyp when the axial value conversion coefficient Udr needs to be considered.

$$\delta x_{p1,p2}=X1-(x1\cos\theta_{p1,p2}+y1\sin\theta_{p1,p2})*Udr_{p1,p2}.$$

$$\delta y_{p1,p2}=Y1-(-x1\sin\theta_{p1,p2}+y1\cos\theta_{p1,p2})*Udr_{p1,p2}.$$

$$\delta x_{p2,p3}=X2-(x2\cos\theta_{p2,p3}+y2\sin\theta_{p2,p3})*Udr_{p2,p3}.$$

$$\delta y_{p2,p3}=Y2-(-x2\sin\theta_{p2,p3}+y2\cos\theta_{p2,p3})*Udr_{p2,p3}.$$

$$\delta x_{p1,p3}=X3-(x3\cos\theta_{p1,p3}+y3\sin\theta_{p1,p3})*Udr_{p1,p3}.$$

$$\delta y_{p1,p3}=Y1-(-x3\sin\theta_{p1,p3}+y1\cos\theta_{p1,p3})*Udr_{p1,p3}.$$

As will be apparent to a person skilled in the art, the individual axial origin offset values δxp, δyp may also be calculated as follows:

$$\delta x_{p1,p2}=X2-(x2\cos\theta_{p1,p2}+y2\sin\theta_{p1,p2})*Udr_{p1,p2}.$$

$$\delta y_{p1,p2}=Y1-(-x1\sin\theta_{p1,p2}+y2\cos\theta_{p1,p2})*Udr_{p1,p2}.$$

$$\delta x_{p2,p3}=X3-(x3\cos\theta_{p2,p3}+y3\sin\theta_{p2,p3})*Udr_{p2,p3}.$$

$$\delta y_{p2,p3}=Y3-(-x3\sin\theta_{p2,p3}+y3\cos\theta_{p2,p3})*Udr_{p2,p3}.$$

$$\delta x_{p1,p3}=X1-(x1\cos\theta_{p1,p3}+y1\sin\theta_{p1,p3})*Udr_{p1,p3}.$$

$$\delta y_{p1,p3}=Y1-(-x1\sin\theta_{p1,p2}+y1\sin\theta_{p1,p3})*Udr_{p1,p3}.$$

Again, using the example coordinates P1=−8, 6, P2=9, 10 and P3=2, −6 (reference point coordinates identified by the source system); and the coordinates for the destination system reference points P1=−58, −5, P2=20, 49 and P3=14, −48 then the resulting axial origin offset values δx, δy are: $\delta x_{p1,p2}$=−6.43278; $\delta_{p1,p2}$=−20.1727; $\delta x_{p2,p3}$=−6.85464; $\delta y_{p2,p3}$=−20.6656; $\delta x_{p1,p3}$=−7.13661; and $\delta y_{p1,p3}$=−19.9973. The system axial origin offset values δx, δy are then typically calculated as average axial origin offset values as follows:

$$\delta x=(\delta x_{p1,p2}+\delta x_{p2,p3}+\delta x_{p1,p3})/3;\text{ and}$$

$$\delta y=(\delta y_{p1,p2}+\delta y_{p2,p3}+\delta y_{p1,p2})/3.$$

Alternatively, the system axial origin offset values δx,δy may be calculated as follows:

$$\delta x=(X1+X2+X3)/3-(x1+x2+x3)/3;\text{ and}$$

$$\delta y=(Y1+Y2+Y3)/3-(y1+y2+y3)/3.$$

The method 400, at a calculating block 435, performs calculating estimated coordinates of each destination system reference point P1, P2, P3 based on one of the axial rotation angles θ and system axial origin offset values δx, δy estimated without the source reference coordinates of the destination system reference point. The general formula for estimating each destination system reference point along the X axis is: X'=(x cos θ+y sin θ)+δx, or alternatively when the conversion coefficient Udr is required then X'=(x cos θ+y sin θ)/Udr+δx. Similarly, the general formula for estimating each destination system reference point along the Y axis is: Y'=(−x sin θ+y3 cos θ)+δy, or alternatively when the conversion coefficient Udr is required then Y'=(−x sin θ+y3 cos θ)/Udr+δy. For instance, when estimating coordinates X3', Y3' for destination system reference value P3, the calculating is performed as follows:

$$X3'=(x3\cos\theta_{p1,p2}+y3\sin\theta_{p1,p2})/Udr_{p1,p2}+\delta x.$$

$$Y3'=(-x3\sin\theta_{p1,p2}+y3\cos\theta_{p1,p2})/Udr_{p1,p2}+\delta y.$$

For the estimated coordinates X2', Y2' for destination system reference value P2, the calculating is performed as follows:

$$X2'=(x2\cos\theta_{p1,p3}+y2\sin\theta_{p1,p3})/Udr_{p1,p3}+\delta x.$$

$$Y2'=(-x2\sin\theta_{p1,p3}+y2\cos\theta_{p1,p3})/Udr_{p1,p3}+\delta y.$$

Also, for the estimated coordinates X1', Y1' for destination system reference value P1, the calculating is performed as follows:

$$X1'=(x1\cos\theta_{p2,p3}+y1\sin\theta_{p2,p3})/Udr_{p2,p3}+\delta x.$$

$$Y1'=(-x1\sin\delta_{p2,p3}+y1\cos\theta_{p2,p3})/Udr_{p2,p3}+\delta y.$$

The method 400, at a comparing coordinates block 440, performs a process of comparing the estimated destination coordinates of each destination system reference point (X1', Y1', X2', Y2', X3', Y3') with the actual destination system reference coordinates (X1, Y1, X2, Y2, X3, Y3) to determine which estimated axial rotation angle provides the least error value based on the formula SQRT[(X−X')²+(Y−Y')²]. This process of comparing is therefore effected by calculating a least error value Er as follows:

$$Er(\theta_{p1,p2})=SQRT[(X3-X3')^2+(Y3-Y3')^2].$$

$$Er(\theta_{p2,p3})=SQRT[(X1-X1')^2+(Y1-Y1')^2].$$

$$Er(\theta_{p1,p3})=SQRT[(X2-X2')^2+(Y2-Y2')^2].$$

Again, using the example coordinates P1=−8, 6, P2=9, 10 and P3=2, −6 (reference point coordinates identified by the source system); and the coordinates for the destination system reference points P1=−58, −5, P2=20, 49 and P3=14, −48 then the resulting estimated Errors are: $Er(\theta_{p1,p2})$=2.66; $Er(\theta_{p2,p3})$=2.66; and $Er(\theta_{p1,p3})$=2.97.

Once the axial rotation angle and associated axial origin offset value that provide the least error value are determined, the method 400, at an estimating block 445, performs estimating the destination system coordinates Xpx, Ypx of the location of the selected point Px. The destination system coordinates (X, y) are estimated from the system axial origin offset values δx,δy, the source system (x, y) coordinates for the selected point Px and estimated axial rotation angle θ that provides the least error Er. The destination coordinates X, Y for the selected point Px can therefore be calculated as follows:

$$X=(x\cos\theta+y\sin\theta)/Udr+\delta x;$$

$$Y=(-x\cos\theta+y\sin\theta)/Udr+\delta y,$$

where x, y are the source system coordinates of the selected point provided by the source system, θ and δ are the associated axial rotation angle and origin offset value that provide the least error Er, and Udr is an optional axial value conversion coefficient.

When conducting the comparing, at comparing block 440, the estimated axial rotation angle and associated axial value conversion coefficient Udr may be adjusted to provide the least error value Er. Thus, the the axial value conversion coefficient Udr is an adjusted axial origin offset value Udr' that reduce the error value and ideally substantially minimise the error value Er. Furthermore, the estimated axial rotation angle θ is adjusted estimated axial rotation angle θ' that reduce the error value Er and ideally substantially minimise the error value Er.

The destination system 200 will typically have an axis scaling value X/Y (X/Y ratio) in which the scale of the X and Y axes may differ slightly. This axis scaling value X/Y is caused by positioning the surface 105 of the object 104 in a non-parallel planar alignment relative o an imaging plane of the imaging module 102. If the axis scaling value X/Y along with the adjusted axial value conversion coefficient Udr' and adjusted estimated axial rotation angle θ' are suitably determined they can substantially minimise the error value Er.

The axis scaling value X/Y along with the adjusted axial value conversion coefficient Udr' and adjusted estimated axial rotation angle θ' are determined by multi-parameter (multi-variable) regression analysis. For example, consider the following values in table 1 below.

TABLE 1

Selected parameter values for reference point pairs.

| Ref. points | θ | Udr | X/Y |
|---|---|---|---|
| P1-P2 | −0.02972 | 0.999628 | 1 |
| P2-P3 | −0.03051 | 1.000212 | 1 |
| P3-P1 | −0.02902 | 1.000662 | 1 |

As mentioned above, the method 400 uses multi-parameter regression. In this regard, midpoint values for θ, Udr and Y/X are used and X/Y is assumed to have a midpoint of 1, then the regression values to identify a substantially minimum error Er are calculated in this embodiment by determining five values for each of θ, Udr and X/Y during regression. For instance, initially the scaling value X/Y will have assumed max value of 1.1; min value of 0.9; center value of 1; mid-lower value of 0.95 and mid-higher value of 1.05. Also, the average axial origin offset values δx, δy are preferably used in estimating the minimum error Er' and estimating the destination system coordinates X', Y' for the selected point Px. Furthermore, the error value Er' is calculated by the formula $Er'=(X1-X1')^2+(X2-X2')^2+(X3-X3')^2+(Y1-Y1')^2+(Y2-Y2')^2+(Y3-Y3')^2$, where the values X1', X2', X3', Y1', Y2', Y3' are calculated as follows:

$$X'=((x\cos\theta+y\sin\theta)/Udr)+\delta x;$$

$$Y'=((-x\cos\theta+y\sin\theta)/Udr)*X/Y+\delta y.$$

Similarly, the destination coordinates X, Y for the selected point Px are therefore calculated as follows:

$$X=((x\cos\theta+y\sin\theta)/Udr)+\delta x;$$

$$Y=((-x\cos\theta+y\sin\theta)/Udr)*X/Y+\delta y.$$

From the above, the method 400 performs multi-parameter regression one the parameters θ, Udr and X/Y by initially, for instance, selecting parameter X/Y refining the value of X/Y to obtain a reduced Error Value Er'. Similar refinements of θ and Udr can be conducted wherein for Udr (based on the above values of Table 1 are) are Min=0.999628; Centre=1.000212; Max=1.000662; mid-low=(Centre+Min)/2=0.99992; Mid-high=(Centre+Max)/2=1.000437. Similarly, for θ Min=−0.02902; Centre=0.02972; Max=−0.03051; mid-low=(Centre+Min)/2=−0.2937; Mid-high=(Centre+Max)/2=−0.030115. The first stages of multi-parameter regression for parameter X/Y are illustrated in Table 2 and Table 3. In Table 2, the parameter values for X/Y that provides a minimum error for an iteration are used as the next Centre value. Thus at iterations 1 to 5 the minimum error is provided by parameter X/Y=1; at iteration 6 the parameter X/Y=0.998438 provides the minimum error and at iteration 7 parameter X/Y=0.999219 provides the minimum error Er'.

TABLE 2

First stages of multi-parameter regression for parameter X/Y.

| Iteration | Parameter | Min | Mid-low | Centre | Mid-high | Max |
|---|---|---|---|---|---|---|
| 1 | X/Y | 0.9 | 0.95 | 1 | 1.05 | 1.1 |
| 2 | X/Y | 0.95 | 0.975 | 1 | 1.075 | 1.05 |
| 3 | X/Y | 0.975 | 0.9875 | 1 | 1.0625 | 1.075 |
| 4 | X/Y | 0.9875 | 0.99375 | 1 | 1.06875 | 1.0625 |
| 5 | X/Y | 0.99375 | 0.996875 | 1 | 1.065625 | 1.06875 |
| 6 | X/Y | 0.996875 | 0.998438 | 1 | 1.067188 | 1.065625 |
| 7 | X/Y | 0.996875 | 0.996875 | 0.998438 | 0.999219 | 1 |
| 8 | X/Y | 0.998438 | 0.998828 | 0.999219 | 0.999609 | 1 |

TABLE 3

Initial multi-parameter regression iterations.

| Iteration # | θ | Udr | X/Y | Error Er |
|---|---|---|---|---|
| 1 | −0.02972 | 1.000212 | 1 | 20.51 |
| 6 | −0.02972 | 1.000212 | 0.998438 | 14.37 |
| 7 | −0.02972 | 1.000212 | 0.999219 | 11.14 |
| 9 | −0.02972 | 0.99992 | 0.999219 | 5.19 |
| 10 | −0.02972 | 0.99992 | 0.998828 | 2.87 |
| 16 | −0.02972 | 0.999701 | 0.998535 | 0.25 |

The above multi-parameter bisecting regression method is used to estimate values of θ, Udr and Y/X for estimating the destination system coordinates X, Y of the location of the selected point Px from the source coordinates x, y. Also taken into account is the system axial origin offset values δx, δy.

The multi-parameter bisecting regression method iteratively bisects a range of values for a selected parameter (θ, Udr and Y/X) to determine a minimum or near minimum error value Er. The multi-parameter regression method therefore estimates the most suitable values of θ, Udr and Y/X can be determined in order to calculate selected point Px or points. The multi-parameter regression method keeps performing the bisecting iterations on a parameter until the reduction in the error value Er between iterations is below an improving threshold level. When this occurs then another one of the parameters is selected and the bisecting iterations on the selected parameter and so on until the error value Er is below an acceptable threshold error value.

Figure 5:
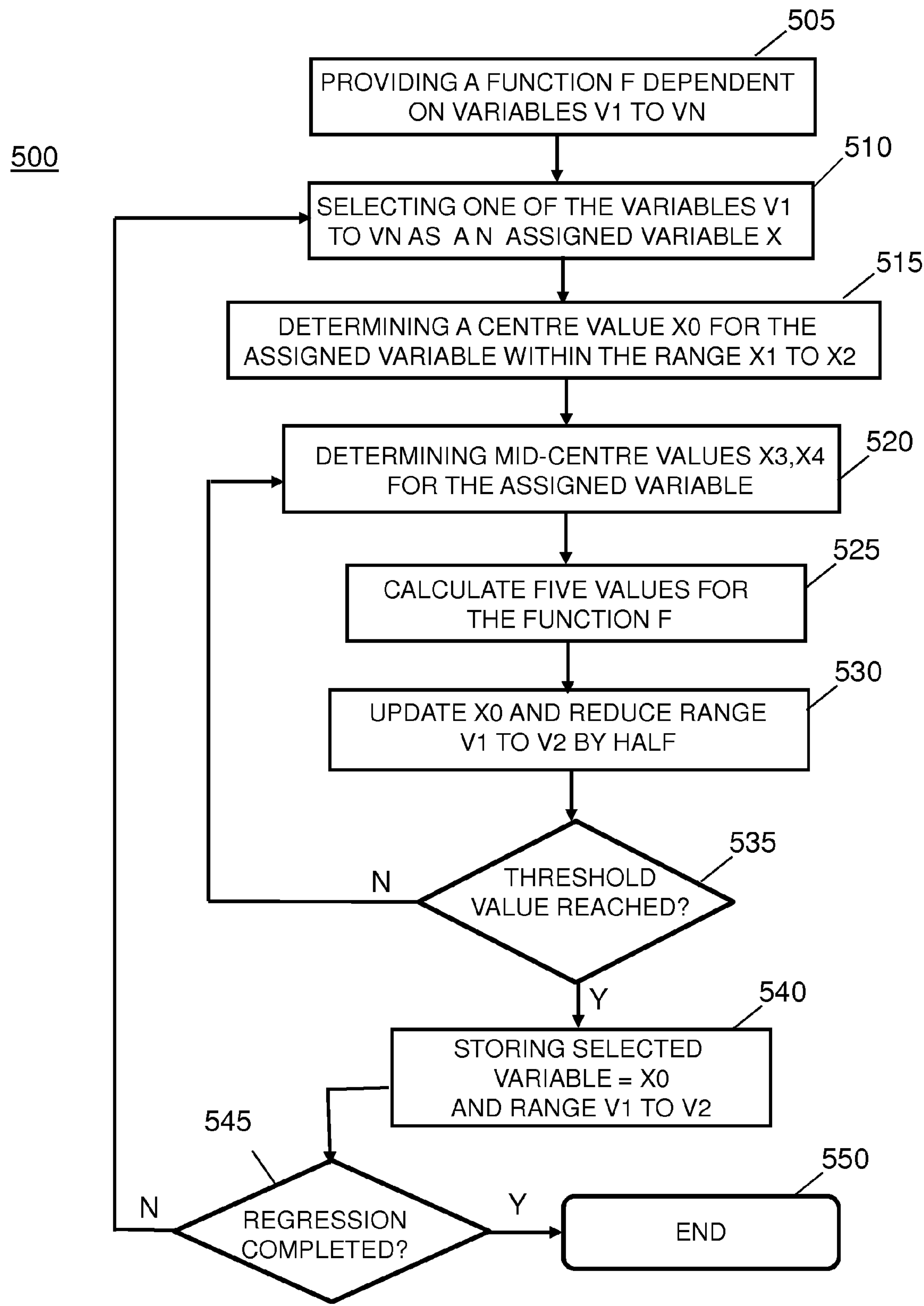
FIG. 5 is a flow chart illustrating a multi-parameter bisecting regression method for determining values of a function's variables that result in a minimum or maximum value of the function in accordance with a preferred embodiment of the present invention.

The multi-parameter bisecting (or bisectional) regression method can be used on numerous applications. Referring to FIG. 5, a flow chart of a multi-parameter bisecting regression method 500 for determining values of a function's variables that result in a minimum or maximum value of the function in accordance with a preferred embodiment of the present invention is shown. The bisecting regression method 500 can suitably be used to determine a minimum value for a multi-parameter function Y=F(V1 to VN) where Y is at a minimum when each variable V1 to VN=V1min to VNmin. The method 500, at a block 505, performs providing the multi-parameter function Y=F(V1 to VN) in which the function is dependent on the parameters or variables V1 to VN. At a block 510 the method performs selecting one of the variables V1 to VN as an assigned variable X. For instance V1 can be initially assigned as X. Next, at a block 515, there is performed a determining a centre value X0 for the assigned variable X with the range X1 to X2. The range X1 to X2 can be initially arbitrarily set or it may be based on prior knowledge such as the X/Y ratio described above or it could be based on calculations such as those for Udr and θ described above. Hence, the centre value X0=(X1+X2)/2. It will therefore be apparent that the above procedures in essence perform a process of selecting a variable value from one of the variables and a variable range, wherein the variable is a centre value at the centre of the range X1 to X2.

The method 500 then, at a block 520, determines mid-centre values of the range X1 to X2 that are a mid-low value X3 and mid-high value X4. These values are determined by calculations wherein he mid min-low value X3=(X1+X0)/2 and the mid-high value X4=(X2+x0)/2.

The method 500, at a block 525, then calculates five function values for the multi-parameter function Y=F(V1 to VN) for each of the five values of X (specifically X0, X1, X2, X3, X4) replacing the variable V1 whereas all other variables (V2 to VN) remain constant. Thus, the five function values are based on variable values of the range extremities X1 and X2, mid-centre values X3 and X4 and the centre value X0. The method 500 then, at a block 530, updates the value of X0, this value X0 is one of the five values of X0 to X4 that gives the smallest value of Y. The range X1 to X2 is reduced by half and normalized about the value X0 so that X0 is centrally located about the range X1 to X2. In other words, the method 500 has updated centre value X0 with a new centre value X0, reduced the variable range X1 to X2 and determined new mid-centre values X3 and X4, wherein the new centre value X0 is selected from the variable value (X0 to X4) that indicated a minimum or maximum function value. For instance, if the previous five values for X were X1=4; X2=12; X0=8; X3=6; X4=10 then if the variable value X4=10 indicated a minimum function value the updated value of X0 would be 10 and the updated range would be X1=8 and X2=12.

The method 500 at a test block 535 then determines if a threshold value TV has been reached. This threshold value TV may be an iteration counter value or based on error values as described hereinabove. If the threshold value TV has not been reached then the method 500 repeats blocks 520 to 530 using the updated value of X0 and the updated range X1 to X2. However, if the threshold value TV has been reached then the currently updated value of X0 and the updated range X1 to X2 are stored at block 540. A test block 454 then determines if the method 500 has completed its regression process and found a minimum or near minimum. This test block 454 terminates the method 500 at block 550 when each of the variables V1 to VN has been selected by block 515 m times where m is threshold value that is typically set to 3 but this number can vary if required. Otherwise the method returns to block 510. It will therefore be apparent that the method 500 repeats calculating five function values, updating the centre value, reducing the variable range and determining new mid-centre values until one or more threshold values are reached.

Advantageously, the present invention reduces or at least alleviates the effects of the errors caused in identifying the selected point Px or points from the source system coordinates x, y. For instance the selected points Px are typically locations of identified faults that require analysing the destination system. The present invention therefore overcomes or at least alleviates misalignment and scaling errors between the two systems, thus the destination system 300 can therefore more identify the selected point Px. The invention also allows for errors in identifying points of interest or selected points to be reduced or alleviated by use of multi-parameter bisectional regression.

The present invention is particularly useful for transferring coordinates of faults detected in integrated circuits using an OBIRCH system to a FIB system, which is used to analyze the detected faults.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A method for determining coordinates for a destination system, the coordinates identifying a location of at least one selected point on a surface of an object from data provided from a source system, the data comprising source system reference coordinates for three reference points marked on the surface of the object and source system coordinates for the at least one selected point, the method comprising:

providing the destination system with the source system reference coordinates and the source system coordinates for the at least one selected point;

selecting pairs of the source system reference coordinates;

identifying destination system reference coordinates from the three reference points;

estimating at least three axial rotation angles of the reference points identified by the destination system reference coordinates relative to the reference points identified by the source system reference coordinates, wherein the axial rotation angles are determined by comparing the pairs of the source reference coordinates with corresponding pairs of the destination reference coordinates;

estimating system axial origin offset values based on the source system reference coordinates and the destination system reference coordinates;

calculating estimated coordinates of each destination system reference point based on at least one of the axial rotation angles, the system axial origin offset values and source reference coordinates;

comparing the estimated coordinates of the destination system reference points with the destination system reference coordinates to determine which estimated axial rotation angle provides a least error value; and determining the destination system coordinates of the location of the at least one selected point from the system axial origin offset values, source coordinates for the at least one selected point and the estimated axial rotation angle that provides the least error value.

2. The method for determining coordinates for a destination system of claim 1, wherein the estimating axial rotation angles performs the calculation:

$$\theta=\tan^{-1}\{(y2-y1)/(x2-x1)\}-\tan^{-1}\{(Y2-Y1)/(X2-X1)\},$$

wherein θ is an axial rotational angle, x1, y1 and x2, y2 correspond to coordinates for a selected pair of source reference points P1, P2; and X1, Y1 and X2, Y2 correspond to destination reference coordinates for the source reference points.

3. The method for determining coordinates for a destination system of claim 2, wherein the axial origin offset values are based on estimated axial origin offset values of the destination system axes compared with the source system axes for each of the axial rotation angles.

4. The method for determining coordinates for a destination system of claim 1, wherein the estimating axial origin offset values performs the calculation:

$$\delta x = X - (x \cos\theta + y \sin\theta)/Udr;$$

wherein δx is an axial origin offset value along the X axis; X is a destination system reference coordinate for a reference point P1; x and y are source system reference coordinates for same the reference point P1; and Udr is an axial value conversion coefficient.

5. The method for determining coordinates for a destination system of claim 4, wherein the axial value conversion coefficient is estimated by the calculation:

$$Udr = \mathrm{SQRT}\{[(y2-y1)^2+(x2-x1)^2]/[(Y2-Y1)^2+(X2-X1)^2]\}.$$

6. The method for determining coordinates for a destination system of claim 1, wherein the calculating estimated coordinates of each destination system reference point performs the calculations:

$$X' = ((x \cos\theta + y1 \sin\theta)/Udr) + \delta x;$$

$$Y' = ((-x \sin\theta + y1 \cos\theta)/Udr) * X/Y + \delta y,$$

wherein X' and Y' are estimated destination system coordinates for destination system reference point; δx is an axial origin offset value along the X axis; δy is an axial origin offset value along the Y axis; Udr is an axial value conversion coefficient; and X/Y is a scaling value.

7. The method for determining coordinates for a destination system of claim 1, wherein the comparing coordinates includes calculating error values by comparing estimated destination coordinates of each destination system reference point with the actual destination system reference coordinates.

8. The method for determining coordinates for a destination system of claim 7, wherein the calculating error values is performed by the calculation:

$$Er = \mathrm{SQRT}[(X-X')^2+(Y-Y')^2],$$

wherein Er is the error value, X' and Y' are estimated destination system coordinates for destination system reference point; δx is an axial origin offset value along the X axis; and δy is an axial origin offset value along the Y axis.

9. The method for determining coordinates for a destination system of claim 1, wherein the estimating the destination system coordinates is performed by the calculations:

$$X' = ((x \cos\theta + y \sin\theta)/Udr) + \delta x;$$

$$Y' = ((-x \cos\theta + y \sin\theta)/Udr) * X/Y + \delta y,$$

wherein X' and Y' are the estimated destination system coordinates for the at least one selected point; x and y are the source system coordinates for the at least one selected point; δx is the system axial origin offset value along the X axis; δy is the system axial origin offset value along the Y axis; θ is an axial rotational angle that provides the least error value Er; Udr is an axial value conversion coefficient; and X/Y is a scaling value.

10. The method for determining coordinates for a destination system of claim 1, wherein the estimating the destination system coordinates is characterized by the axial value conversion coefficient being an adjusted axial value conversion coefficient that reduces the error value Er.

11. The method for determining coordinates for a destination system of claim 10, wherein the estimating the destination system coordinates is characterized by the axial value conversion coefficient being an adjusted axial value conversion coefficient that substantially minimise the error value.

12. The method for determining coordinates for a destination system of claim 11, wherein the estimating the destination system coordinates is characterized by the estimated axial rotation angle being adjusted estimated axial rotation angle that reduce the error value.

13. The method for determining coordinates for a destination system of claim 12, wherein the estimating the destination system coordinates is characterized by the estimated axial rotation angle being adjusted estimated axial rotation angle that substantially minimises the error value.

14. The method for determining coordinates for a destination system of claim 1, wherein the estimating the destination system coordinates is characterized by the estimating taking into account an axis scaling value of the destination system axes.

15. The method for determining coordinates for a destination system of claim 14, wherein the axis scaling value, adjusted axial value conversion coefficient and adjusted estimated axial rotation angle substantially minimise the error value.

16. The method for determining coordinates for a destination system of claim 15, wherein the axis scaling value, adjusted axial value conversion coefficient values and adjusted estimated axial rotation angle are determined by multi-parameter regression analysis.

17. The method for determining coordinates for a destination system of claim 16, wherein the at least one selected point indicates a position of a fault on a semiconductor die detected by the source system.

18. The method for determining coordinates for a destination system of claim 17, wherein the source system comprises an OBIRCH system and the destination system comprises a FIB system.

* * * * *